June 10, 1941. H. BUCHANAN 2,244,867
LICENSE PLATE BRACKET
Filed April 4, 1940
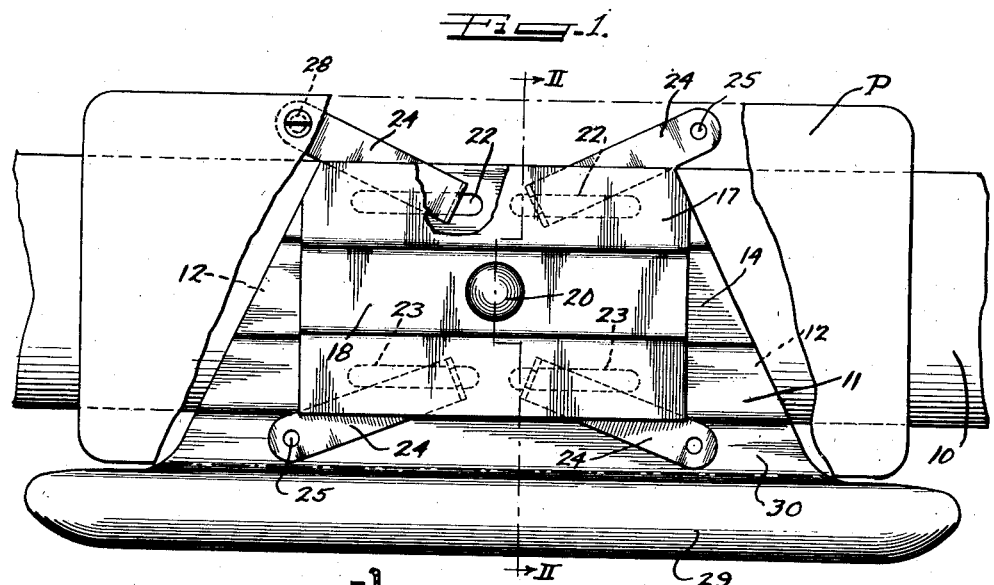
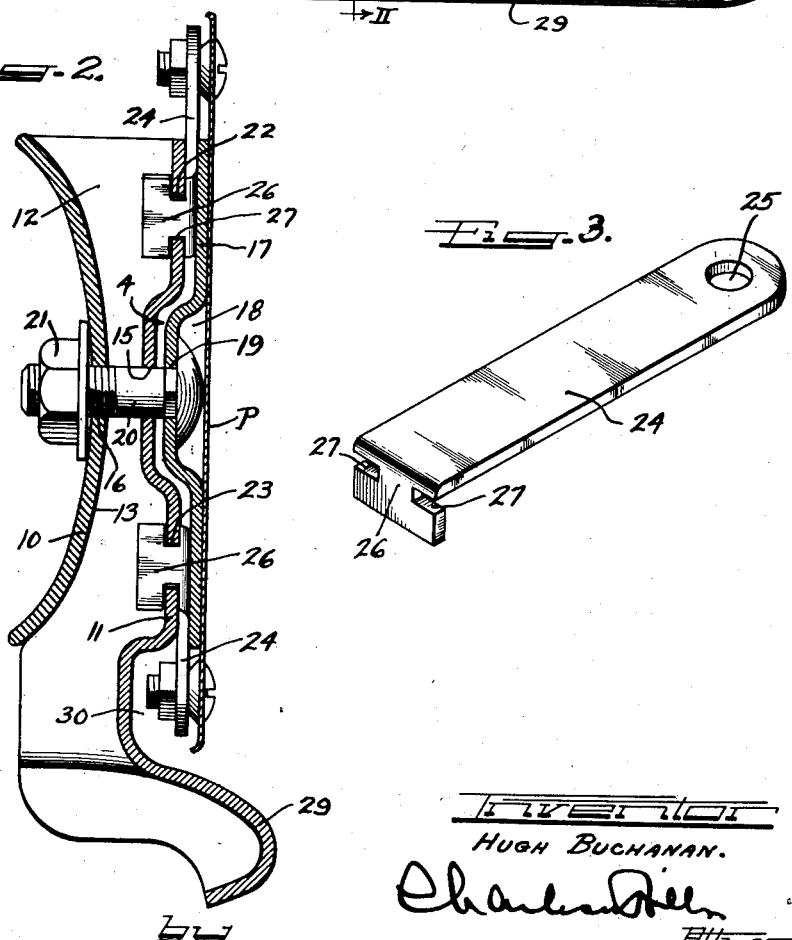
Inventor
HUGH BUCHANAN.

Patented June 10, 1941

2,244,867

UNITED STATES PATENT OFFICE 2,244,867

LICENSE PLATE BRACKET

Hugh Buchanan, Detroit, Mich., assignor to Houdaille-Hershey Corporation, Detroit, Mich., a corporation of Michigan Application April 4, 1940, Serial No. 327,859

2 Claims. (Cl. 40—125)

This invention relates to improvements in license plate holders or brackets, the object being to produce a holder or bracket more adapted for the modern types of cars.

Heretofore the license plate holder or bracket has been mounted usually at the rear corners of the automobile frame or body, or on the bumper structure at the ends thereof. However, in modern types of cars, the bumpers are provided with guard structures at their ends to afford protection for the vehicle fenders and lamps or other accessories mounted thereon so that the license plate holder or bracket, in order that the license plate may be properly visible, should be mounted on the bumper intermediate the ends thereof. It is therefore the important object of our invention to provide a license plate holder or bracket which can be conveniently mounted on the bumper impact bar, preferably at the middle thereof, and which is constructed so that it will accommodate all the different sizes of license plates which are used and at the same time have no portion which would project laterally beyond the supported license plate, and also to so construct the holder or bracket that it will afford a certain degree of protection for the plate against impact by bumpers on other vehicles.

The improved holder or bracket is shown on the accompanying drawing, in which drawing:

Figure 1 is a front elevation of the middle portion of a bumper impact bar and the license plate holder mounted thereon;

Figure 2 is an enlarged section on plane II—II Figure 1; and

Figure 3 is a perspective view of one of the supporting links.

The holder structure is shown applied to a bumper impact bar 10 of convex transverse curvature. The holder structure comprises a body 11 shown as a plate having side flanges 12 extending rearwardly therefrom and having their rear edges provided with concave recesses 13 for receiving the impact bar and fitting against the convex front face thereof. The body has the longitudinally extending channel 14 which at its middle point has the bolt hole 15 for registering with the bolt hole 16 through the impact bar located preferably midway between the upper and lower edges of the bar.

In front of the body 12 is a clamping plate 17 which is substantially rectangular and which is deflected to provide the longitudinally extending channel 18 for paralleling and extending partially into the channel 14 of the holder body, the channel having the bolt hole 19 for registering with the bolt holes 15 and 16 to receive a bolt 20 whose head engages in the channel 18 and whose threaded end receives the nut 21 behind the impact bar.

The body plate 11 has upper longitudinally extending and aligned slots 22 therethrough, and similar lower slots 23, these slots being behind the clamping plate 17. Each of the slots serves to receive a plate-holding link 24 in the form of a length of flat bar having at its outer end a bolt hole 25 and having its inner end 26 deflected at right-angles and provided with slots 27 in its opposite edges. These T-shaped ends of the links extend through the respective slots 22 and 23, the width of the slots being slightly greater than the width of the end 26 between the slots 27 therein so that when the links are at substantially right-angles with the slots 22 or 23, the ends 26 may be withdrawn from the slots, but when the links are at an angle with the slots the links cannot be removed therefrom but may be swung vertically or shifted laterally. As shown, the upper two links extend upwardly from the body 11 while the lower links extend downwardly and as these links may readily be swung vertically or shifted laterally, they may be readily adjusted to bring their bolt holes 25 into alignment with the bolt holes or slots 28 adjacent the upper and lower edges of the license plate P which is to be supported. Such mounting of the license plate on the links and proper aligning of the plate is done while the bolt 20 is loosened. After the plate has been mounted and has been properly aligned, the nut 21 is drawn up so that the clamping plate 17 will be drawn toward the body plate 11 for rigidly clamping of the supporting links between the body plate and clamping plate, and after the bolt is tightened it will clamp the entire bracket structure with the license plate thereon securely to the bumper impact bar, and preferably the holder structure is mounted on the impact bar at the middle thereof. The lateral and upward extent of the body 11 and clamping plate 17 is preferably such that different sizes of license plates may be efficiently supported but without any of the holder structure projecting laterally or upwardly beyond the license plate.

In order to afford protection for the license plate against impact by bumper structure on other vehicles, the lower portion of the body 11 may be deflected outwardly to provide a guard bar portion 29 extending horizontally below the license plate and, as shown, this deflected guard bar forming portion may be of channel shape to be of greater strength and also to present a pleasing appearance. In order to permit ready access for securing the license plate to the lower supporting link, the portion of the body 11 above the guard bar portion 29 may be deflected rearwardly to provide clearance space 30. With my improved arrangement, the entire bracket structure above the guard bar portion 29 is covered by the license plate so that the license plate will be fully and clearly visible at all times.

I have shown a practical and efficient embodiment of the features of my invention but I do not desire to be limited to the exact construction and arrangement shown and described as changes and modifications may be made without departing from the scope of the invention.

I claim as follows:

1. In combination, a bumper impact bar, a holder mounted on said impact bar to support a license plate or the like comprising front and rear vertical walls and with the rear wall shaped to receive and set against the front face of an impact bar, links extending from between said walls and having pin and slot connections with said rear wall whereby to be pivoted for bodily or swinging movement for adjustment of their ends into position to have a license plate secured thereto to extend across the front of said walls, a bolt extending through said walls and the bumper impact bar for clamping said walls and bar together and to clamp said links rigidly in their adjusted position, and a guard bar forming part of said rear wall and extending horizontally and forwardly of said walls to afford protection for the supported license plate.

2. A holder for an automobile license plate or the like comprising front and rear separable walls, said rear wall at its middle portion being deflected rearwardly to form a longitudinally extending channel, said front wall along its middle portion being deflected rearwardly to form a longitudinally extending ridge for engaging in the rear wall channel whereby said walls will be held against relative vertical or rotational movement, said rear wall having longitudinally extending slots above and below the channel in said wall, links having their inner ends between said walls and each link having pin connection with one of said slots whereby said links may be rotated or shifted bodily for securement at their outer ends to a license plate to be supported, and a securing means for securing said walls together and for clamping said links between them in their adjusted plate holding position.

HUGH BUCHANAN.